(12) United States Patent
Hennige et al.

(10) Patent No.: US 7,811,700 B2
(45) Date of Patent: Oct. 12, 2010

(54) SEPARATOR-ELECTRODE UNIT FOR LITHIUM-ION BATTERIES, METHOD FOR THE PRODUCTION AND USE THEREOF IN LITHIUM BATTERIES

(75) Inventors: Volker Hennige, Duelmen (DE); Christian Hying, Rhede (DE); Gerhard Hoerpel, Nottuln (DE); Sven Augustin, Dorsten (DE)

(73) Assignee: Evonik Degussa GmbH, Essen (DE)

( * ) Notice: Subject to any disclaimer, the term of this patent is extended or adjusted under 35 U.S.C. 154(b) by 995 days.

(21) Appl. No.: 10/524,665

(22) PCT Filed: Jul. 4, 2003

(86) PCT No.: PCT/EP03/07158

§ 371 (c)(1),
(2), (4) Date: Feb. 11, 2005

(87) PCT Pub. No.: WO2004/021475

PCT Pub. Date: Mar. 11, 2004

(65) Prior Publication Data

US 2005/0221192 A1 Oct. 6, 2005

(30) Foreign Application Priority Data

Aug. 24, 2002 (DE) ................................ 102 38 943

(51) Int. Cl.
*H01M 2/26* (2006.01)
(52) U.S. Cl. ................... 429/121; 429/232; 429/231.95
(58) Field of Classification Search ................ 429/129, 429/232, 231.95
See application file for complete search history.

(56) References Cited

U.S. PATENT DOCUMENTS

| 3,379,570 A | 4/1968 | Berger et al. |
| 3,625,771 A | 12/1971 | Arrance et al. |

(Continued)

FOREIGN PATENT DOCUMENTS

EP 0 766 326 4/1997

(Continued)

OTHER PUBLICATIONS

U.S. Appl. No. 10/524,145, filed Feb. 11, 2005, Hennige, et al.

(Continued)

*Primary Examiner*—Jane Rhee
(74) *Attorney, Agent, or Firm*—Oblon, Spivak, McClelland, Maier & Neustadt, L.L.P.

(57) ABSTRACT

The separator-electrode units comprise a porous electrode which is useful as a positive electrode (cathode) or negative electrode (anode) in a lithium battery and a separator layer applied to this electrode and are characterized in that the separator-electrode units comprise a purely inorganic separator layer which comprises at least two fractions of metal oxide particles which differ from each other in their average particle size and/or in the metal. More particularly, the separator layer comprises metal oxide particles having an average particle size ($D_g$) which is greater than the average pore size (d) of the pores of the porous positive electrode that are bonded together by metal oxide particles having a particle size ($D_k$) which is smaller than the pores of the porous electrode.

14 Claims, 3 Drawing Sheets

U.S. PATENT DOCUMENTS

| | | | |
|---|---|---|---|
| 4,447,376 | A | 5/1984 | Kuenze et al. |
| 6,287,720 | B1 * | 9/2001 | Yamashita et al. .......... 429/131 |
| 6,299,668 | B1 | 10/2001 | Penth et al. |
| 6,299,778 | B1 * | 10/2001 | Penth et al. ................. 210/650 |
| 6,306,545 | B1 | 10/2001 | Carlson et al. |
| 6,309,545 | B1 | 10/2001 | Penth et al. |
| 6,340,379 | B1 | 1/2002 | Penth et al. |
| 6,383,386 | B1 | 5/2002 | Hying et al. |
| 6,620,320 | B1 | 9/2003 | Hying et al. |
| 6,841,075 | B2 | 1/2005 | Penth et al. |
| 2002/0023419 | A1 | 2/2002 | Penth et al. |
| 2002/0039648 | A1 | 4/2002 | Horpel et al. |
| 2004/0038105 | A1 | 2/2004 | Hennige et al. |
| 2004/0262169 | A1 | 12/2004 | Hying et al. |
| 2005/0031942 | A1 | 2/2005 | Hennige et al. |
| 2005/0070193 | A1 | 3/2005 | Hennige et al. |
| 2005/0084761 | A1 | 4/2005 | Hennige et al. |
| 2005/0087491 | A1 | 4/2005 | Hennige et al. |
| 2007/0099072 | A1 | 5/2007 | Hennige et al. |

FOREIGN PATENT DOCUMENTS

| | | |
|---|---|---|
| WO | 99 15262 | 4/1999 |
| WO | 03 021697 | 3/2003 |

OTHER PUBLICATIONS

U.S. Appl. No. 10/524,143, filed Feb. 11, 2005, Hennige, et al.
U.S. Appl. No. 10/524,669, filed Feb. 11, 2005, Hennige, et al.
U.S. Appl. No. 10/536,270, filed May 25, 2005, Hennige, et al.
U.S. Appl. No. 10/535,400, filed May 18, 2005, Hennige, et al.
U.S. Appl. No. 10/519,097, filed Dec. 27, 2004, Hennige, et al.
U.S. Appl. No. 10/575,274, filed Apr. 11, 2006, Hennige, et al.
U.S. Appl. No. 10/575,734, filed Apr. 13, 2006, Hoerpel, et al.
U.S. Appl. No. 11/578,664, filed Oct. 18, 2006, Hoerpel, et al.
U.S. Appl. No. 11/577,542, filed Apr. 19, 2007, Hoerpel, et al.
U.S. Appl. No. 11/917,914, filed Dec. 18, 2007, Holzapfel, et al.
U.S. Appl. No. 12/063,626, filed Feb. 12, 2008, Hying, et al.
U.S. Appl. No. 12/021,436, filed Jan. 29, 2008, Pascaly, et al.
U.S. Appl. No. 12/066,146, filed Mar. 7, 2008, Schormann, et al.
U.S. Appl. No. 12/388,671, filed Feb. 19, 2009, Hennige, et al.

\* cited by examiner

SEPARATOR-ELECTRODE UNIT FOR LITHIUM-ION BATTERIES, METHOD FOR THE PRODUCTION AND USE THEREOF IN LITHIUM BATTERIES

CROSS REFERENCES TO RELATED APPLICATIONS

This application is a national stage application of International Patent Application No. PCT/EP03/07158, filed on Jul. 4, 2003, and claims priority to German Patent Application No. 102 38 943.8, filed on Aug. 24, 2002, both of which are incorporated herein by reference in their entireties.

This invention relates to a separator-electrode unit for lithium ion batteries, a process for production thereof and also their use.

An electrical separator is a separator used in batteries and other systems in which electrodes have to be separated from each other while maintaining ion conductivity for example.

The separator is customarily a thin porous insulating material possessing high ion permeability, good mechanical strength and long-term stability to the chemicals and solvents used in the system, for example in the electrolyte of the battery. In batteries, the separator should fully electronically insulate the cathode from the anode, but be pervious to the electrolyte. Moreover, the separator has to be permanently elastic and follow movements in the system, for example in the electrode pack in the course of charging and discharging.

The separator is a crucial determinant of the use life of the system in which it is used, for example the use life of battery cells. The development of rechargeable batteries is therefore marked by the development of suitable separator materials.

General information about electrical separators and batteries may be found for example in J. O. Besenhard in "Handbook of Battery Materials" (VCH-Verlag, Weinheim 1999).

Separators in use at present consist predominantly of porous organic polymeric films (eg EP 0 892 448, EP 0 967 671) or of inorganic nonwovens, for example nonwovens composed of glass or ceramic materials or else ceramic papers. These are produced by various companies. Important producers include Celgard, Tonen, Ube, Asahi, Binzer, Mitsubishi, Daramic and others. A typical organic separator consists for example of polypropylene or of a polypropylene/polyethylene/poly-propylene composite.

Lithium secondary batteries are today generally produced by electrodes and separators having been fabricated separately and only combined by the battery manufacturer. This can be accomplished for example by laminating at elevated pressure and temperature. It would be simpler to apply the separator directly to one of the two electrodes. The positive electrode (cathode) usually consists of a porous lithium compound, for example $LiCoO_2$ or $LiMnO_2$, bound into, or bonded together by, a heat-resistant polymer matrix, for example poly-vinylidene fluoride. The negative electrode (anode) frequently consists of graphite which is likewise adhered to a polymer. The direct application of thin, porous layers or films to conventional separator materials, such as PP and PE, is very difficult.

Today it is therefore customary for electrode and separator to be joined together by laminating. For this to work, the separators used comprise a relatively heat-resistant polymer. In EP 1 049 188, for example, a separator is produced by forming a lithium-glass-ceramic powder which is suspended in a solution of polyvinylidene fluoride (PVDF) and hexafluoropropylene in acetone and subsequently forming a film from this suspension. The separator thus produced is laminated onto the positive electrode. Similarly, the separator described in DE 199 18 856 is produced on its own and is subsequently laminated onto the positive electrode. The separator described in DE 199 18 856 is likewise obtained by forming a film from a suspension, in this case a solution of a nitrogen-containing aromatic polymer (as a very heat-resistant polymer) and ceramic powder.

The prior art further discloses the direct coating of the negative electrode (graphite) with a porous polymeric layer (WO 01/91219, WO 01/89022), which may include ceramic particles such as $TiO_2$, $SiO_2$ or $Al_2O_3$ as a filler. Direct coatings of electrodes, neither anode nor cathode, with pure ceramics are not known from the prior art.

Ceramic separators for lithium ion batteries are likewise virtually unknown. WO 99/15262 describes a composite material formed by suspensions of ceramic particles being applied onto and into a porous support and solidified therein. This composite material is likewise said to be useful as a separator. There is no description of a direct production of separator-electrode units in WO 99/15262. In addition, investigations have shown that the materials and technique described therein do not allow the production of separator-electrode units.

It is an object of the present invention to provide a process whereby a separator-electrode unit may be formed by direct production of the separator on the electrode. Such a separator-electrode unit should ideally exhibit a flexibility as can likewise be exhibited by a unit producible by laminating.

It has been found that, surprisingly, applying a suspension of metal oxide particles selected from $Al_2O_3$ and $ZrO_2$ having a particle size which is preferably greater than the pore size of the electrode to be coated, in a sol, and subsequent solidification into a porous inorganic layer on the electrode can be used to coat the electrode with a thin separator which after impregnation with an electrolyte solution or an electrolyte gel possesses excellent ion conductivity and also exhibits the highest possible meltdown safety. Such a separator-electrode unit may further possess a flexibility which corresponds to that of the positive or negative electrode used.

The present invention accordingly provides a separator-electrode unit comprising a porous electrode useful as an electrode, ie positive or negative electrode, in a lithium battery and a separator layer applied to this electrode, characterized in that the separator-electrode unit comprises an inorganic separator layer which comprises at least two fractions of metal oxide particles which differ from each other in their average particle size and/or in the metal.

The present invention also provides a process for producing a separator-electrode unit according to the present invention, which comprises forming a porous inorganic coating separator layer on a porous electrode substrate useful as a positive or negative electrode in a lithium battery by applying a suspension which comprises metal oxide particles in a sol and solidifying the inorganic separator layer on the electrode by at least one thermal treatment.

The present invention further provides for the use of a separator-electrode unit according to the present invention in lithium batteries and also lithium batteries which comprise a separator-electrode unit according to the present invention.

The separator-electrode unit according to the present invention has the advantage that it is very simple to produce. The method of production also ensures that the separator is very firmly bonded to the electrode. The separator layer used is not a porous polymer, but a porous ceramic layer. This ceramic layer is applied to the electrode via a suspension (slip) and solidified there at moderate temperatures. This makes it possible to apply very thin separator layers which have only very low resistance after infiltration with the electrolyte. This separator/electrode unit is thus particularly suitable for use in high power and high energy batteries. The separator-electrode unit according to the present invention also possesses very good mechanical stability and is in particular flexible. The use of a porous ceramic separator layer virtually excludes the possibility of whisker growth in or through the separator. In addition, the ceramic layer constitutes very good protection against a mechanical shortcircuit of the two electrodes, such as a free-standing separator can never be. The inorganic, ceramic separator layer also makes it impossible for a meltdown of the battery or separator to occur. The herein described separator layer in the separator-electrode units is thus much safer than any polymeric separators, but also safer than a ceramic separator based on a polymeric nonwoven support.

Safety plays a very important part in lithium batteries. In contrast to other types of battery (Pb, NiCd, NiMeH), the solvent used for the electrolyte is not water but a flammable solvent, for example ethylene carbonate (EC), propylene carbonate (PC), dimethyl carbonate (DMC), since water would decompose at the high potentials in the lithium cell. For this reason, the separator can and must make a decisive contribution to the safety of a high energy battery. In the event of overheating and destruction of the cell, lithium batteries can thus give rise to a fire or an explosion.

Under the heading of safety, a fundamental distinction must be drawn between two aspects:

1 Heating due to cell malfunction,

2 External heating.

The former case can arise, for example, when an internal shortcircuit occurs in the operation of the battery. The battery can then very rapidly self-discharge in a hazardous reaction. This will produce such large electric currents that a closed battery cell can in the least favorable case even explode.

Polymeric separators provide for example the safety performance demanded at present of lithium batteries by impeding any ionic transport between the electrodes beyond a shutdown temperature, which is about 120° C. This is because, at this temperature, the pore structure of the separator collapses and all the pores close up. As a result of ionic transport being stopped, the hazardous reaction which can lead to an explosion ceases.

In the second case, however, if the cell is further heated owing to external circumstances, the meltdown temperature will be exceeded at about 150° C. At this temperature, the separator, which customarily is composed of PP, after all, will start to melt and contract. The two electrodes then come into direct contact at many locations in the battery cell and so there will be internal shortcircuiting over a large area. This leads to an uncontrolled reaction which ends with the cell exploding, or the resultant pressure is released by an overpressure valve (a bursting disk), frequently with signs of fire.

The separator-electrode unit of the present invention, which comprises an inorganic separator layer, can never give rise to a meltdown, since the heat-resistant inorganic particles will ensure that the separator does not melt. It is thus ensured that there are no operating states in which shortcircuiting can occur over a large area. Even in the event of an external fire which heats the cell to above 200° C., the ceramic separator will continue to perform its function.

If a shutdown mechanism is desired, this can be achieved in a simple manner by coating the surface of the separator layer with particles of a material which will melt on reaching a certain temperature and so close the pores in the separator layer and thus prevent any further ion flux. This can be achieved for example by means of an additionally applied polymeric or wax layer whose melting point is in the desired range.

The separator-electrode unit according to the present invention is also very safe in the event of internal shortcircuiting due to an accident for example. If, for example, a nail would puncture a battery, the following would happen depending on the type of separator: a polymeric separator would melt at the site of puncture (a shortcircuit current flows through the nail and causes it to heat up) and contract. As a result, the shortcircuit location will become larger and larger and the reaction would get out of control. In the case of the separator layer according to the present invention which is equipped with a shutdown mechanism, the polymeric material of the shutdown layer would melt, but not the inorganic separator layer. So the reaction in the interior of the battery cell following such an accident would proceed much more moderately. This battery is thus distinctly safer than one equipped with a polymeric separator, which is why batteries having separator-electrode units according to the present invention can be used in mobile applications in particular, where there is a distinctly higher risk of accidents than with stationary or portable applications.

The separator-electrode unit of the present invention, by virtue of its simple manner of production, also has a distinct cost advantage over units which are produced in a conventional manner, since that requires the performance of an additional operation, namely the joining together of separator and electrode.

The preferred use for the production of the porous ceramic separator layer of precisely size-coordinated metal oxide particles provides a particularly high porosity to the ready-produced separator layer, although the porosity is still sufficiently small to prevent lithium whiskers growing through the separator. A particularly advantageous way to achieve an ideal pore size or porosity for the separator is for the metal oxide particles used, prior to the suspending, to be classified by wind sifting or hydroclassification in order that ideally equal-sized metal oxide particles may be used, since commercially available metal oxide particles frequently contain during production, storage and/or transportation a not inconsiderable fraction of particles which are distinctly smaller (eg fines or the like) or else distinctly larger (eg aggregates, agglomerates). But the presence of a large number of comparatively small particles has the consequence that the pores in the separator layer or even the pores in the electrode are partially obstructed, or completely occluded, by these small particles. It is then not always possible to achieve the ideal pore size or porosity for the separator.

Owing to the high porosity in connection with the low thickness of the separator layer and the very good wettability of the hydrophilic ceramic layer with polar solvents, it is also possible for the separator to be completely, or at least substantially completely, saturated with the electrolyte, so that it is impossible for dead spaces, in which no electrolyte is present, to arise in individual regions of the separator and hence in certain coils of the battery cells. This is achieved in particular when, by virtue of the size of the metal oxide particles being controlled, the separators are free or substantially free of closed pores into which the electrolyte cannot penetrate. Owing to the low thickness and the high porosity of the separator layer, the separator-electrode unit is especially suitable for use in lithium high energy and high power batteries.

The separator-electrode unit according to the present invention and a process for producing it will now be described without the invention being limited to these embodiments.

The separator-electrode unit according to the present invention comprises a porous electrode suitable for use as a positive electrode in a lithium battery and a separator layer applied to this electrode and comprises an inorganic separator layer which comprises at least two fractions of metal oxide particles which differ from each other in their average particle size, preferably by more than a factor of 10, and/or in the metal. In a preferred embodiment of the invention, the two particle fractions comprise metal oxide particles which differ not only in the metal but also in their particle size. The inorganic separator layer, as well as the inorganic substituents, may comprise small amounts of organic and especially silicon-organic compounds. The fraction of the inorganic separator layer which is made up of these organic constituents is however preferably less than 5% by weight, more preferably less than 1% by weight and more preferably less than 0.1% by weight. These silanes act as adhesion promoters to improve the bonding of the ceramic to the electrodes.

The two particle fractions in the separator layer, irrespectively of whether they comprise metal oxides of the same or different metals, preferably comprise particles whose particle sizes differ by a factor of at least 10 and more preferably by a factor of at least 100. Preferably, the separator-electrode unit according to the present invention comprises a separator layer which comprises metal oxide particles having an average particle size ($D_g$) which is greater than the average pore size (d) of the pores of the porous positive electrode that are adhered by metal oxide particles which have a particle size ($D_k$) which is smaller than the pores of the porous positive electrode. The thickness (z) of the separator layer is preferably in the range from less than $100 D_g$ to not less than $1.5 D_g$ and more preferably in the range from less than $20 D_g$ to not less than $5 D_g$.

The metal oxide particles having an average particle size ($D_g$) which is greater than the average pore size (d) of the pores of the porous positive electrode are preferably $Al_2O_3$ and/or $ZrO_2$ particles. The metal oxide particles having an average particle size ($D_k$) which is less than the average pore size (d) of the pores of the porous positive electrode are preferably $SiO_2$ and/or $ZrO_2$ particles.

The separator-electrode units according to the present invention more preferably comprise metal oxide particles having an average particle size ($D_g$) which is greater than the average pore size (d) of the pores of the porous positive electrode where the average particle size ($D_g$) is less than 10 µm, preferably less than 5 µm and most preferably less than 3 µm. For a separator layer thickness of $5 D_g$, an average particle size of 3 µm will thus result in a separator layer thickness of about max. 15 µm. Preferred separator layer thicknesses are less than 25 µm and preferably in the range from 10 to 15 µm. If necessary, however, the separator layer thickness can also be less than 10 µm.

The add-on weights are preferably in the range from 10 to 200 g/m², more preferably less than 100 g/m² and most preferably less than 50 g/m².

The porosity of the separator layer of the separator-electrode unit according to the present invention is preferably in the range from 30 to 70% (determined by mercury porosimetry). By virtue of the high porosity, the good wettability and the low thickness of the separator layer, the separator layer is readily impregnable or fillable with electrolytes, which is why the separator layer exhibits a relatively high ion conductivity. The low thickness provides a particularly low electrical resistance for the separator in use with an electrolyte. The separator-electrode unit is therefore particularly suitable for high power batteries. The separator itself naturally has a very high electrical resistance, since it itself has to have insulating properties. In addition, comparatively thin separators permit an increased packing density in a battery stack, so that a larger amount of energy can be stored in the same volume. The separator-electrode unit is therefore particularly useful for high energy batteries.

The mechanical properties of the separator-electrode unit are essentially determined by the electrode because of the low thickness of the separator layer. Typical tensile strengths are in the region of the tensile strengths of the metallic support used to make the separator-electrode unit. This tensile strength is about 10 N/cm or higher in the case of expanded metals, depending on the expanded metal used, and more than 15 N/cm where metal foils are used. The separator-electrode unit may be made flexible. Preferably, a separator-electrode unit according to the present invention is bendable down to a radius of 100 m, preferably down to 50 cm and more preferably down to 5, 4, 3, 2 or 1 mm.

The positive electrode of the separator-electrode unit according to the present invention can be any conventional electrode. Preferably, the separator-electrode unit according to the present invention comprises an electrode which comprises lithium-containing compounds, especially lithium-containing inorganic compounds, for example $LiCoO_2$, $LiMnO_2$, lithium iron phosphates or similar mixed oxides. Typically, these compounds are combined with graphite or carbon black, a very thermally stable polymer, for example polyvinylidene fluoride, polyacrylic or polystyrene, and a solvent to form pastes which are applied to a thin metal foil, for example aluminum foil, and solidified by removing the solvent. Preferred electrodes have a very high porosity, preferably in the range from 20 to 40% (determined by Hg porosimetry) in order that a very large active surface area may be provided. Particularly preferred electrodes have average pore sizes (d) from 0.5 to 20 µm and preferably from 5 to 10 µm. The metal foil may be either singly or else preferably bothsidedly coated. Bothsidedly coated positive electrodes preferably have a thickness of 160-200 µm and a basis weight of 550-700 g/m². FIG. 1 shows an electron micrograph of a typical cathode. However, the values may distinctly differ from those mentioned, depending on the battery customer's requirements.

The negative electrode of the separator-electrode unit according to the present invention can likewise be any conventional electrode. Preferably, the separator-electrode unit according to the present invention comprises an electrode which comprises electrically conductive carbon compounds, for example natural or artificial graphites, carbon black or the like. Typically, these compounds are combined with a very thermally stable polymer, for example polyvinylidene fluoride, polyacrylic or polystyrene, and a solvent to form pastes which are applied to a thin metal foil, for example copper foil, and solidified by removing the solvent. Preferred electrodes have a very high porosity, preferably in the range from 20 to 40% (determined by Hg porosimetry) in order that a very large active surface area may be provided. Particularly preferred electrodes have average pore sizes (d) from 0.5 to 20 µm and preferably from 5 to 10 µm. The metal foil may be either singly or else preferably bothsidedly coated. Bothsidedly coated negative electrodes preferably have a thickness of 200-250 µm and a basis weight of 350-450 g/m². However, the values may distinctly differ from those mentioned, depending on the battery customer's requirements.

With both electrodes and in the case of bothsidely coated current collectors, the separator layer can be applied on one or both of the sides, depending on what the battery customer wants for their process.

In order that the separator-electrode unit according to the present invention has a shutdown mechanism, it may be preferable for the separator layer to comprise a coating with preferably waxy or polymeric shutdown particles which melt at a desired shutdown temperature. Particularly preferred materials for the shutdown particles include for example natural or artificial waxes, low-melting polymers, eg polyolefins, the material for the shutdown particles being selected such that the particles melt at the desired shutdown temperature and close the pores of the separator, preventing further ion flux.

The coating with shutdown particles may be present on the separator layer and/or between the separator layer and the electrode. But it is preferable, depending on the desired shutdown temperature, for the coating with shutdown particles to have been applied to the separator layer. This is dictated inter alia by the way the shutdown particle coating is produced. Coating between the separator layer and the electrode would have to be effected by applying the shutdown particle layer to the electrode and subsequently applying the separator layer and therefore is only ever possible when the shutdown temperature and hence the melting point of the material of the shutdown particles, for example natural or artificial wax, low-melting polymers, eg polyolefins, is above the temperature which has to be employed to solidify the separator layer.

The shutdown particles preferably have an average particle size ($D_w$) which is not less than the average pore size ($d_s$) of the pores of the separator layer and, when the shutdown layer is situated between separator and electrode, is likewise greater than the average pore size (d) of the pores of the porous electrode. This is advantageous in particular because this prevents pores of the electrodes or of the separator layer being penetrated and closed, which would result in a reduction in the pore volume and hence in the conductivity of the separator and also the performance of the battery. The thickness of the shutdown particle layer is only critical insofar as an excessively thick layer would unnecessarily increase the resistance in the battery system. To ensure safe shutdown, the shutdown particle layer shall have a thickness ($z_w$) ranging from approximately equal to the average particle size of the shutdown particles ($D_w$) up to 10 $D_w$ and preferably from 2 $D_w$ to $D_w$.

The overall thickness of the separator-electrode unit (without the additional shutdown particle layer) is greatly dependent on the thickness of the electrode. Typically, in the case of bothsidedly coated electrodes, the thickness is less than 350 µm, preferably less than 250 µm and most preferably less than 200 µm at an otherwise constant cell capacity.

The separator-electrode units according to the present invention are preferably produced by a process for producing separator-electrode units which comprises forming a porous inorganic coating separator layer on a porous electrode substrate useful as a positive or negative electrode in a lithium battery by applying a suspension which comprises metal oxide particles in a sol and solidifying the inorganic separator layer on the electrode by at least one thermal treatment.

The substrate used can be any conventional electrode which is suitable for use as a positive electrode in a lithium battery. The substrate used preferably comprises electrodes which comprise lithium-containing compounds, especially lithium-containing inorganic compounds, for example $LiCoO_2$, $LiMnO_2$, lithium iron phosphates or similar mixed oxides. Typically, these compounds are combined with graphite or carbon black, a very thermally stable polymer, for example polyvinylidene fluoride, polyacrylic or polystyrene, and a solvent to form pastes which are applied to a thin metal foil, for example aluminum foil, and solidified by removing the solvent. Preferred electrodes have a very high porosity, preferably in the range from 20 to 40% (determined by Hg porosimetry) in order that a very large active surface area may be provided. Particularly preferred electrodes have average pore sizes (d) from 0.5 to 20 µm and preferably from 5 to 10 µm. The metal foil may be either singly or else preferably bothsidedly coated. Bothsidedly coated positive electrodes to be used as substrate preferably have a thickness of 160-200 µm and a basis weight of 550-700 g/m².

The substrate used can likewise be any conventional electrode which is suitable for use as a negative electrode in a lithium battery. The substrate used preferably comprises electrodes which comprise electrically conductive carbon compounds, for example natural or artificial graphites, carbon black or the like. Typically, these compounds are combined with a very thermally stable polymer, for example polyvinylidene fluoride, polyacrylic or polystyrene, and a solvent to form pastes which are applied to a thin metal foil, for example copper foil, and solidified by removing the solvent. Preferred electrodes have a very high porosity, preferably in the range from 20 to 40% (determined by Hg porosimetry) in order that a very large active surface area may be provided. Particularly preferred electrodes have average pore sizes (d) from 0.5 to 20 µm and preferably from 5 to 10 µm. The metal foil may be either singly or else preferably bothsidedly coated. Bothsidedly coated negative electrodes to be used as substrate preferably have a thickness of 200-250 µm and a basis weight of 350-450 g/m².

The employed suspension according to the present invention preferably comprises metal oxide particles having an average particle size ($D_g$) which is greater than the average pore size (d) of the pores of the porous positive electrode. The suspension is prepared using metal oxide particles or metal oxide particles and having an average particle size ($D_g$) which is greater than the average pore size (d) of the pores of the porous positive electrode that are preferably $Al_2O_3$ and/or $ZrO_2$ particles. The particles used as metal oxide particles more preferably have an average particle size of less than 10 µm, even more preferably less than 5 µm and most preferably of less than 3 µm.

It has been determined that the use of commercially available metal oxide particles leads to unsatisfactory results in certain circumstances, since the particle size distribution is frequently very broad. Preference is therefore given to using metal oxide particles which have been classified by a conventional process, for example wind sifting or hydroclassification. This measure ensures that the inorganic porous separator layer has a very uniform pore size distribution.

The suspension may be applied to the substrate by for example printing on, pressing on, pressing in, rolling on, knifecoating on, spread coating on, dipping, spraying or pouring on. Preference is given to using a suspension where the weight ratio of metal oxide particles to sol is in the range from 1:1 000 to 2:1, preferably in the range from 1:100 to 1:5 and more preferably in the range from 1:4 to 1:1.

The suspension used for producing the coating comprises at least one inorganic oxide of aluminum, of silicon and/or of zirconium and at least one sol of the elements Al, Zr and Si and is prepared by suspending particles of at least one oxide in at least one of these sols.

The sols are obtained by hydrolyzing at least one compound of the elements Zr, Al, Si. It may similarly be preferable for the compound to be hydrolyzed to be introduced into alcohol or an acid or a combination of these liquids prior to hydrolysis. The compound to be hydrolyzed is preferably at least one nitrate, chloride, carbonate or alkoxide compound of the elements Zr, Al or Si. The hydrolysis is preferably carried out in the presence of liquid water, water vapor, ice or an acid or a combination thereof.

In one embodiment of the process according to the present invention, hydrolysis of the compounds to be hydrolyzed is used to prepare particulate sols. These particulate sols are notable for the compounds formed by hydrolysis being present in the sol in particulate form. The particulate sols can be prepared as described above or as in WO 99/15262. These sols customarily have a very high water content, which is preferably above 50% by weight. It may be preferable for the compound to be hydrolyzed to be introduced into alcohol or an acid or a combination of these liquids prior to hydrolysis. The hydrolyzed compound may be peptized by treatment with at least one organic or inorganic acid, preferably with a 10-60% organic or inorganic acid, more preferably with a mineral acid selected from sulfuric acid, hydrochloric acid, perchloric acid, phosphoric acid and nitric acid or a mixture thereof. The particulate sols thus prepared can be subsequently used for preparing suspensions.

In a further embodiment of the process according to the present invention, hydrolysis of the compounds to be hydrolyzed is used to prepare polymeric sols. These polymeric sols are notable for the fact that the compounds formed by hydrolysis are present in the sol in polymeric form, ie in the form of chains crosslinked across a relatively large space. The polymeric sols customarily include less than 50% by weight and preferably much less than 20% by weight of water and/or aqueous acid. To obtain the preferred fraction of water and/or aqueous acid, the hydrolysis is preferably carried out in such a way that the compound to be hydrolyzed is hydrolyzed with from 0.5 to 10 times the molar ratio and preferably with half the molar ratio liquid water, water vapor or ice, based on the hydrolyzable group of the hydrolyzable compound. The amount of water used can be up to 10 times in the case of compounds which are very slow to hydrolyze, such as tetraethoxysilane. Compounds which are very quick to hydrolyze, such as zirconium tetraethoxide, are perfectly capable under these conditions of forming particulate sols as it is, which is why it is preferable to use 0.5 times the amount of water to hydrolyze such compounds. A hydrolysis with less than the preferred amount of liquid water, water vapor or ice likewise leads to good results, although using more than 50% less than the preferred amount of half the molar ratio is possible but not very sensible, since hydrolysis would no longer be complete and coatings based on such sols would not be very stable using an amount below this value.

To prepare these sols with the desired very low fraction of water and/or acid in the sol, it may be preferable for the compound to be hydrolyzed to be dissolved in an organic solvent, especially ethanol, isopropanol, butanol, amyl alcohol, hexane, cyclo-hexane, ethyl acetate and/or mixtures thereof, before the actual hydrolysis is carried out. A sol thus prepared can be used for preparing the suspension according to the present invention or as an adhesion promoter in a pretreatment step.

Both the particulate sols and the polymeric sols can be used as a sol to prepare the suspension in the process of the present invention. Not just sols which are obtainable as just described can be used, but in principle also commercially available sols, for example zirconium nitrate sol or silica sol. The process of preparing separators by applying a suspension to and solidifying it on a substrate is known per se from DE 101 42 622 and in similar form from WO 99/15262, but not all the parameters and ingredients can be transferred to the preparation of the membrane of the present invention. More particularly, the operation described in WO 99/15262 is in that form not transferable to the production of separator-electrode units and electrodes as a substrate, since the process described in WO 99/15262 had for its object to apply a coating in and on the substrate, and this has to be expressly prevented in the present process in order that occlusion or obstruction of the pores of the electrodes may be prevented. In addition, the very watery sol systems described in WO 99/15262 frequently do not permit complete in-depth wetting of the customarily hydrophobic electrodes, since the electrodes, which frequently comprise a polyvinylidene fluoride binder, are only badly wetted by the very watery sol systems, if at all. It has been determined that even the minutest unwetted areas on the surface of the electrode can lead to separator layers being obtained that have defects (eg holes or cracks) and hence are inutile.

It has now been found that a sol system or suspension whose wetting behavior has been adapted to the surface of the electrode will completely wet the surface and so provide defect-free coatings. In the process of the present invention, it is therefore preferable to adapt the wetting behavior of the sol or suspension. This is preferably accomplished by preparing polymeric sols or suspensions of polymeric sols, these sols comprising one or more alcohols, for example methanol, ethanol or propanol or mixtures which comprise one or more alcohols and also, preferably, aliphatic hydrocarbons. But other solvent mixtures are conceivable as well for addition to the sol or suspension in order that the wetting behavior thereof may be adapted to the surface of the electrode used.

It has been determined that the fundamental change in the sol system and in the suspension resulting therefrom leads to a distinct improvement in the adhesion properties of the ceramic components on the surface material of the electrode. Such good adhesivities are normally not obtainable with particulate sol systems. It is therefore preferable to coat electrodes which have hydrophobic polymers at the surface by means of suspensions which are based on polymeric sols or have been equipped with an adhesion promoter in a preceding step by treatment with a polymeric sol.

The sols or suspensions, however, may themselves contain the adhesion promoters, so that good bonding is obtained directly in the course of coating. Good adhesion promoters have to be adapted to the electrode material and come from the family of the alkyltrialkoxysilanes. For instance, triethoxy-(tridecafluorooctyl)silane is very useful for PVDF. The adhesion promoter content is preferably in the range from 0.1 to 20% by weight and most preferably from 1 to 5% by weight in the sol or suspension.

Depending on the type of suspension used, it can be necessary to adjust the viscosity of the suspension. This is especially necessary when the suspension used comprises particles which are smaller than the average pore size of the pores of the electrode. Adjusting the suspension to an appropriately high viscosity prevents penetration of the suspension into the pores of the electrode in the absence of external shearing forces (nonnewtonian behavior). Such behavior is obtainable for example by adding auxiliaries which influence the flow behavior. The auxiliaries used for adjusting the viscosity of the suspension are likewise preferably inorganic materials. It is particularly preferable to add pyrogenic silicas, for example Aerosils from Degussa AG, eg Aerosil 200, to the suspension to adjust the viscosity of the suspension. Since these substances are very effective as auxiliaries for adjusting the viscosity, it is sufficient for the mass fraction of silica in the suspension to be in the range from 0.1 to 10% by weight and preferably in the range from 0.5 to 5% by weight.

The separator layers according to the present invention are applied by solidifying the suspension on the substrate, ie the surface of the electrode, to thereby obtain a separator-electrode unit. This principle is likewise already described in WO 99/15262, but the solidification temperatures specified therein range up to 700° C. and would, in the process of the present invention, lead to destruction of the electrode and also undesirable increased sintering of the metal oxide particles. It is therefore preferable to solidify the suspension which has been applied to the electrode by heating to 50-500° C., preferably 100-250° C. and most preferably 150-200° C. Heating is preferably effected for not more than 60 minutes, preferably not more than 10 minutes and more preferably in the range from 0.5 to 10 minutes, preferably at a temperature of from 150 to 200° C. Treatment temperature and duration are dictated by the thermal stability of the materials present in the electrode used and must be adapted accordingly.

The composite may be heated according to the present invention by means of heated air, hot air, infrared radiation or by other heating methods of the prior art.

The positive electrode can be coated according to the present invention in a batchwise or continuous manner. The coating, ie the production of the separator layer, is preferably carried out by unwinding the positive electrode substrate off a reel, passing it at a speed of from 1 m/h to 2 m/s, preferably at a speed of from 0.5 m/min to 20 m/min and most preferably at a speed of from 1 m/min to 5 m/min through at least one apparatus which applies the suspension to the surface of the electrode, for example a roll, and at least one further apparatus whereby the suspension is solidified on the electrode surface by heating, for example an electrically heated furnace, and winding the thus produced separator-electrode unit up on a second reel at the end. This makes it possible to produce the separator-electrode unit according to the present invention in a continuous process.

The separator-electrode unit may be equipped with an automatic shutdown mechanism by, for example, applying a layer of shutdown particles which, at a desired temperature, melt and close the pores of the separator layer to the separator-electrode unit after the solidification of the suspension which has been applied to the electrode, and fixing the layer of shutdown particles. The layer of shutdown particles may be formed for example by applying a suspension of waxy particles having an average particle size which is greater than the average pore size of the separator layer in a sol, water, solvent or solvent mixture.

The suspension for applying the particles contains preferably from 1 to 50% by weight, more preferably from 5 to 40% by weight and most preferably from 10 to 30% by weight of waxy particles in the suspension.

Since the inorganic separator layer frequently has a very hydrophilic character, it has been determined to be advantageous for the separator-electrode unit to have been prepared using a silane in a polymeric sol as an adhesion promoter and thus to have been hydrophobicized. To achieve good adhesion and uniform distribution of the shutdown particles in the shutdown layer on hydrophilic as well as hydrophobic porous inorganic separator layers, there are several possibilities.

In one version of the process according to the present invention, it has been determined to be advantageous to hydrophobicize the porous inorganic layer of the separator before the shutdown particles are applied. The production of hydrophobic membranes which works according to the same principle is described in WO 99/62624 for example. Preferably, the porous inorganic separator layer is hydrophobicized by treatment with alkyl-, aryl- or fluoroalkylsilanes marketed for example by Degussa under the tradename of Dynasilan. It is possible in this context to employ for example the familiar hydrophobicization methods which are employed inter alia for textiles (D. Knittel; E. Schollmeyer; *Melliand Textilber.* (1998) 79(5), 362-363), with minimal changes to the recipes, for the porous separator layers or the separator-electrode unit as well. To this end, the separator-electrode unit is treated with a solution which includes at least one hydrophobic material. It can be advantageous for the solvent in the solution to be water, preferably adjusted to a pH of 1-3 with an acid, preferably acetic acid or hydrochloric acid, and/or an alcohol, preferably ethanol. The solvent fraction attributable to acid-treated water or to alcohol can be in each case from 0% to 100% by volume. Preferably the fraction of the solvent which is attributable to water is in the range from 0% to 60% by volume and the fraction of solvent which is attributable to alcohol in the range from 40% to 100% by volume. The solvent has introduced into it from 0.1% to 30% by weight and preferably from 1% to 10% by weight of a hydrophobic material to prepare the solution. Useful hydrophobic materials include for example the above-recited silanes. Surprisingly, good hydrophobicization is obtained not just with strongly hydrophobic compounds such as for example triethoxy-(3,3,4,4,5,5,6,6,7,7,8,8-tridecafluorooctyl)silane, but a treatment with methyltriethoxysilane or i-butyl-triethoxysilane is completely sufficient to obtain the desired effect. The solutions are stirred at room temperature to achieve uniform dissipation of the hydrophobic materials in the solution and subsequently applied to the separator layer of the separator-electrode unit and dried. Drying can be speeded up by treatment at temperatures from 25 to 100° C.

In a further version of the process according to the present invention, the porous inorganic separator layer can also be treated with other adhesion promoters before the shutdown particles are applied. The treatment with one of the hereinbelow mentioned adhesion promoters can then likewise be effected as described above, ie by treating the porous inorganic layer with a polymeric sol which includes a silane adhesion promoter.

The layer of shutdown particles is preferably created by applying to the separator layer a suspension of shutdown particles in a suspension medium selected from the group consisting of a sol, water, solvents, for example alcohol, ether or ketones, and a solvent mixture and then drying. The particle size of the shutdown particles present in the suspension is arbitrary in principle. However, it is advantageous for the suspension to include shutdown particles having an average particle size ($D_w$) of not less than and preferably greater than the average size of the pores of the porous inorganic separator layer ($d_s$), since this ensures that the pores of the inorganic layer are not clogged by shutdown particles in the course of the production of the separator according to the present invention. The shutdown particles used preferably have an average particle size ($D_w$) which is greater than the average pore diameter ($d_s$) and less than 5 $d_s$ and more preferably less than 2 $d_2$.

To employ shutdown particles smaller in size than the pores of the porous inorganic layer, the particles must be prevented from penetrating into the pores of the porous inorganic separator layer. Reasons for employing such particles include for example large price differences, but also availability. One way of preventing the penetration of shutdown particles into the pores of the porous inorganic layer is to control the viscosity of the suspension in such a way that absent external shearing forces no penetration of the suspension into the pores of the inorganic layer on the separator takes place. Such a high viscosity for the suspension is obtainable for example by adding auxiliaries which influence the flow behavior, for example silicas (Aerosil, Degussa), to the suspension. When auxiliaries are used, for example Aerosil 200, a fraction from 0.1% to 10% by weight and preferably from 0.5% to 50% by weight of silica, based on the suspension, will frequently be sufficient to achieve a sufficiently high viscosity for the suspension. The fraction of auxiliaries can in each case be determined by simple preliminary tests.

It can be advantageous for the suspension used, which contains shutdown particles, to contain adhesion promoters. Such a suspension with adhesion promoter can be applied directly to a layer of the separator even when the layer was not hydrophobicized beforehand. It will be appreciated that a suspension with adhesion promoter can also be applied to a hydrophobicized separator layer or to a separator layer which has been made employing an adhesion promoter. Adhesion promoters useful in the shutdown particle suspension are preferably silanes having amino, vinyl or methacryloyl side groups. Such adhesion promoters include for example AMEO (3-aminopropyltriethoxysilane), MEMO (3-methacryloyloxypropyltrimethoxysilane), Silfin (vinylsilane+initiator+catalyst), VTEO (vinyltriethoxysilane) or VTMO (vinyltrimethoxysilane). Such silanes are also available for example from Degussa as an aqueous solution under the designation Dynasilan 2926, 2907 or 2781. An adhesion promoter fraction of not more than 10% by weight has been determined to be sufficient for ensuring sufficient adhesion of the shutdown particles to the porous inorganic separator layer. Shutdown particle suspensions with adhesion promoter preferably contain from 0.1% to 10% by weight, more preferably from 1% to 7.5% by weight and most preferably from 2.5% to 5% by weight of adhesion promoter, based on the suspension.

Useful shutdown particles include all particles having a defined melting point. The particle material is chosen according to the desired shutdown temperature. Since relatively low shutdown temperatures are desired for most batteries, it is advantageous to use shutdown particles selected from particles of polymers, polymer blends, natural and/or artificial waxes. Particularly preferred shutdown particles are particles of polypropylene or polyethylene wax.

The shutdown particle suspension may be applied to the porous inorganic layer of the separator by printing on, pressing on, pressing in, rolling on, knifecoating on, spreadcoating on, dipping, spraying or pouring on. The shutdown layer is preferably obtained by drying the applied suspension at a temperature from room temperature to 100° C. and preferably from 40 to 60° C.

It may be preferable for the particles to be fixed after they have been applied to the porous inorganic separator layer, by heating one or more times to a temperature above the glass transition temperature, so that the particles are fused on without undergoing a change in the actual shape. This makes it possible to ensure that the shutdown particles adhere particularly firmly to the porous inorganic separator layer.

The applying of the suspension with subsequent drying and any heating to above the glass transition temperature can be carried out continuously or quasicontinuously. When the starting material used is a flexible separator-electrode unit it can again be unwound off a reel, passed through a coating, drying and, if used, heating apparatus and then be reeled up again.

Separator-electrode units according to the present invention can be used in batteries, especially lithium batteries. The separator-electrode units according to the present invention are suitable for primary and secondary (rechargeable) lithium batteries. When the separator-electrode unit is used according to the present invention in batteries, it is, for example, connected to the counterelectrode and saturated with electrolyte. Owing to the particularly high porosity and pore size and also the low thickness of the separator layer, the separator-electrode unit according to the present invention is especially suitable for use in lithium high power and high energy batteries.

The present invention also provides the lithium batteries themselves, and these may be primary and secondary batteries which comprise a separator-electrode unit of the present invention. Such batteries may similarly be lithium high power and high energy batteries. The separator layer of the separator-electrode unit according to the present invention, when used in such lithium batteries, customarily comprises electrolytes which are lithium salts having large anions in carbonate solvents. Suitable lithium salts include for example $LiClO_4$, $LiBF_4$, $LiAsF_6$, $LiCF_3SO_3$ or $LiPF_6$, of which $LiPF_6$ is particularly preferred. Suitable organic carbonate solvents include for example ethylene carbonate (EC), propylene carbonate (PC), dimethyl carbonate (DMC), ethyl methyl carbonate or diethyl carbonate or mixtures thereof.

The separators according to the present invention are similarly suitable for use in rapidly charged batteries. Owing to the high thermal stability of the separator according to the present invention, a battery which is equipped with this separator will not be so thermally sensitive and therefore will be able to withstand the temperature increase due to the rapid charging without adverse changes to the separator or damage to the battery. These batteries are consequently distinctly more rapid to charge. This is a distinct advantage with regard to the use of thus equipped batteries in electric vehicles, since these no longer have to be charged for several hours but instead the charging can be done within distinctly shorter periods, ie within a few hours and preferably in less than an hour.

The invention is described by FIGS. 1 to 6 without the invention being limited to these embodiments.

Figure 1:
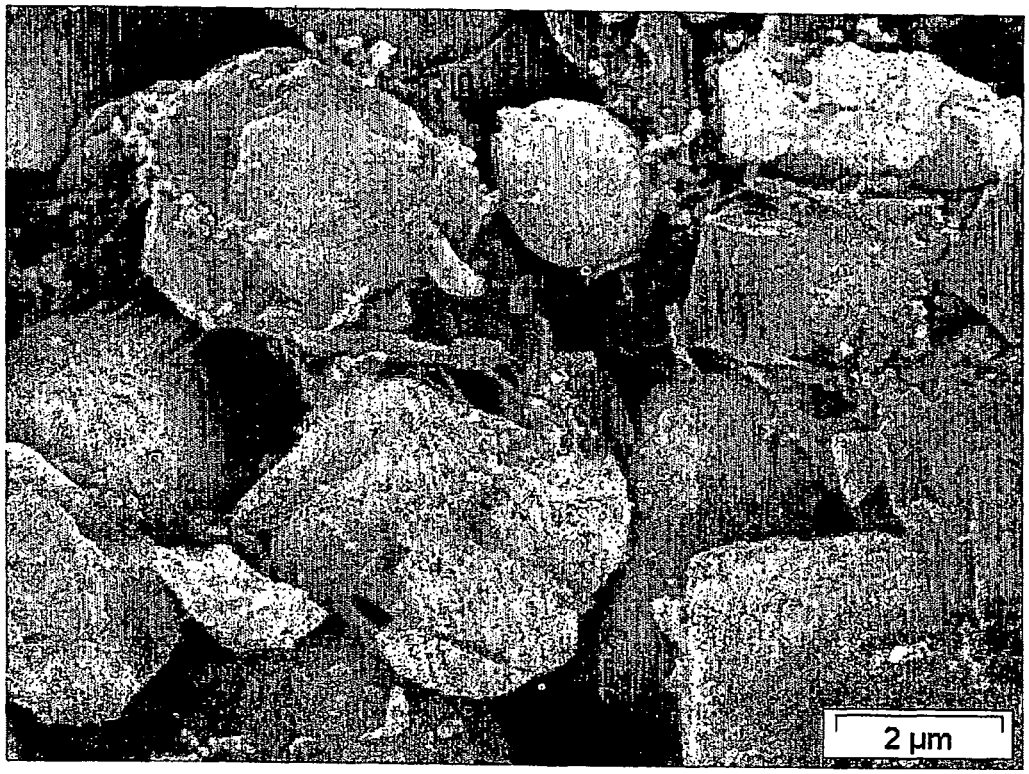
FIG. 1 and FIG. 2 show scanning electron micrographs of a cathode in various enlargements.
Figure 2:
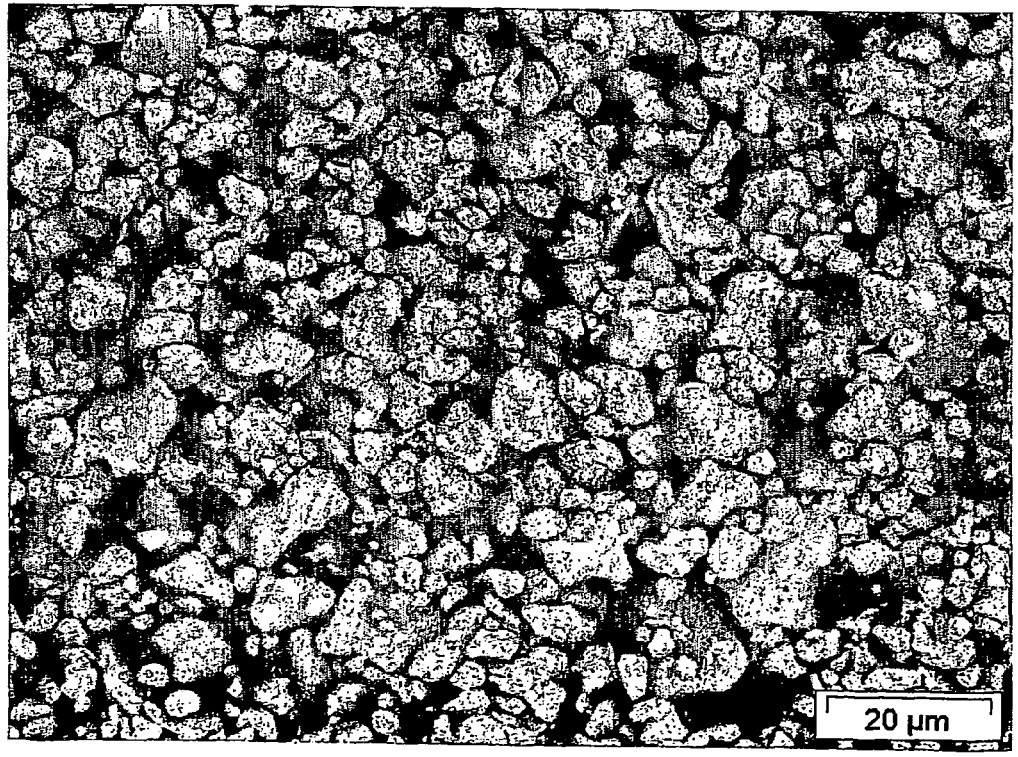

The nonlimiting examples which follow illustrate the present invention.

COMPARATIVE EXAMPLE 1

Production of an S450PET Separator (Comparative, Prior Art Specimen)

To 160 g of ethanol are initially added 15 g of 5% by weight aqueous HCl solution, 10 g of tetraethoxysilane, 2.5 g of methyltriethoxysilane and 7.5 g of GLYMO Dynasilane (all Dynasilanes produced by Degussa AG). This sol, which was initially stirred for some hours, is then used to suspend 125 g each of Martoxid MZS-1 and Martoxid MZS-3 aluminas from Martinswerke. This slip is homogenized with a magnetic stirrer for at least a further 24 h, during which the stirred vessel has to be covered over in order that solvent may not escape.

This slip is then used to coat a PET nonwoven about 30 μm in thickness (thinner nonwovens are difficult to coat with these large particles without holidays and holes) and about 20 g/m² in basis weight in a continuous rollercoating process at a belt speed of about 8 m/h and T=200° C. In this rollercoating process, the slip is coated onto the nonwoven using a roller turning opposite to the belt direction (the direction of movement of the nonwoven). The nonwoven subsequently passes through an oven at the stated temperature. The end result obtained is a separator having an average pore size of 450 nm, a thickness of about 50 μm and a weight of about 50 g/m².

COMPARATIVE EXAMPLE 2

Lithium Ion Battery with Hybrid Ceramic Separator According to Prior Art

An S450PET separator produced as per comparative example 1 is installed in a lithium ion cell consisting of a positive mass of LiCoO₂, a negative mass consisting of graphite and an electrolyte composed of 1M LiPF₆ in ethylene carbonate/dimethyl carbonate [LiCoO₂//S-450-PET, EC/DMC 1:1, 1M LiPF₆//graphite]. Battery performance is stable over several hundred cycles. Owing to the very large internal resistance in the separator, the cell can be charged with constant current to only about 90% of capacity.

INVENTIVE EXAMPLE 1a

Coating a Positive Electrode (Cathode) with a Ceramic Separator Layer 200 g of Al₂O₃ (AlCoA, CT3000 SG) are dispersed in 160 g of ethanol. To this solution are added 10 g of tetraethoxysilane (Dynasilane A, Degussa AG), 10 g of methyltriethoxysilane (Dynasilane MTES, Degussa AG), and 10 g of GLYMO Degussa silane (likewise Degussa AG) and also 15 g of 5% HNO₃. The mixture is stirred overnight to achieve good dispersion of the Al₂O₃ powder.

A double-coated LiCoO₂ electrode on an aluminum current collector is coated therewith in a batch knifecoating operation (gap: 50 μm, forward feed speed: 0.5 m/min) initially from one side and then dried at 150° C. for 30 min. The add-on weight is about 115 g/m², and separator layer thickness is about 50 μm.

INVENTIVE EXAMPLE 1b

Coating a Positive Electrode (Cathode) with a Ceramic Separator Layer 75 g of Al₂O₃ (AlCoA, CT3000 SG) are dispersed in 160 g of ethanol. To this solution are added 10 g of tetraethoxysilane (Dynasilane A, Degussa AG) and 10 g of triethoxy(tridecafluorooctyl)silane (likewise Degussa AG) and also 15 g of 5% HNO₃. The mixture is stirred overnight to achieve good dispersion of the Al₂O₃ powder.

A double-coated LiCoO₂ electrode on an aluminum current collector is coated therewith in a batch knifecoating operation (gap: 50 μm, forward feed speed: 0.5 m/min) initially from one side and then dried at 150° C. for 30 min. owing to the superior adhesion properties of the triethoxy (tridecafluorooctyl)silane, the ceramic separator layer adheres distinctly better to the electrode than in inventive example 1a. The add-on weight is now about 45 g/m², and the separator layer thickness is only just on 20 μm.

INVENTIVE EXAMPLE 2a

Coating a Negative Electrode (Anode) with a Ceramic Separator Layer 125 g each of MZS-1 and MZS-3 Al₂O₃ from Martinswerke are dispersed in 160 g of ethanol. To this solution are added 10 g of tetraethoxysilane (Dynasilane A, Degussa AG), 10 g of methyltriethoxysilane (Dynasilane MTES, Degussa AG) and 10 g of GLYMO Degussa-Silane (likewise Degussa AG) and also 15 g of 5% HNO₃. The mixture is stirred overnight to achieve good dispersion of the Al₂O₃ powder.

Figure 3:
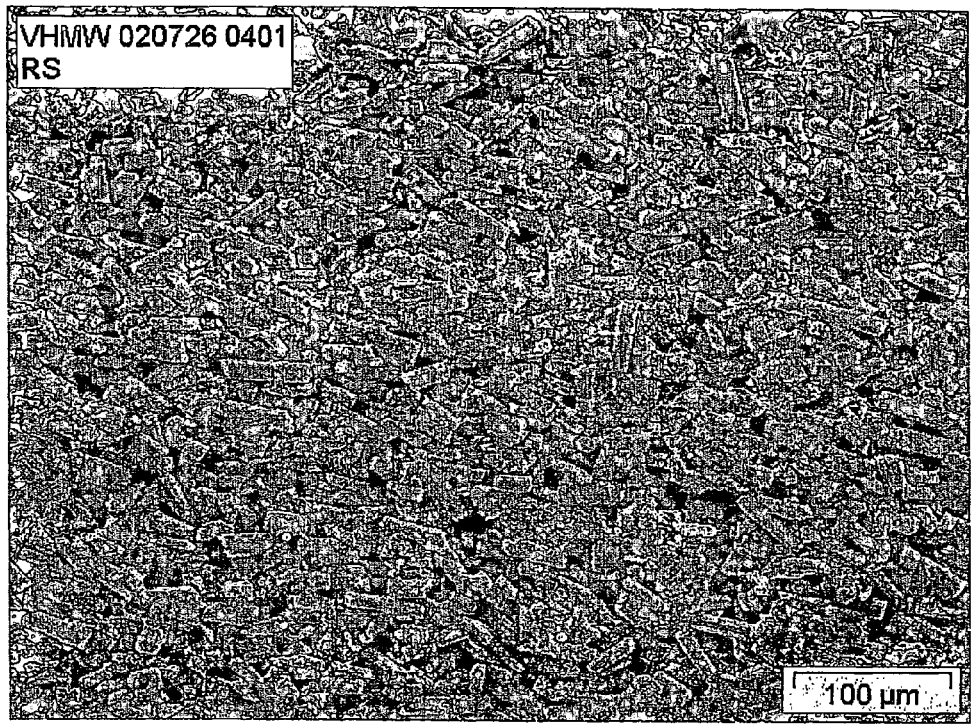
FIG. 3 and FIG. 4 show scanning electron micrographs of an anode in different enlargements.
Figure 4:
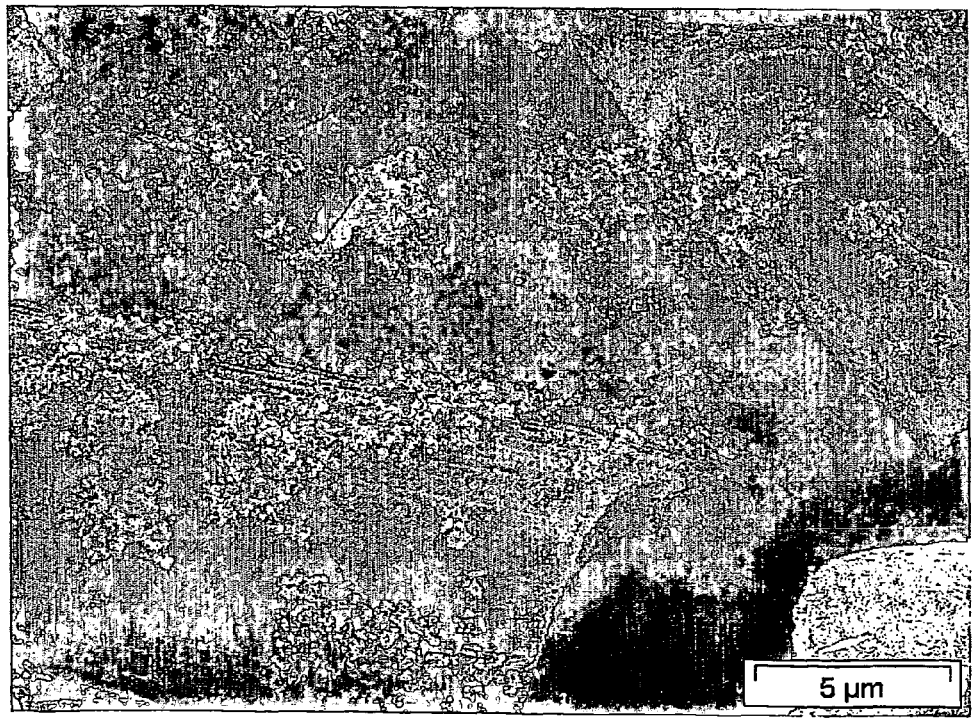
Figure 5:
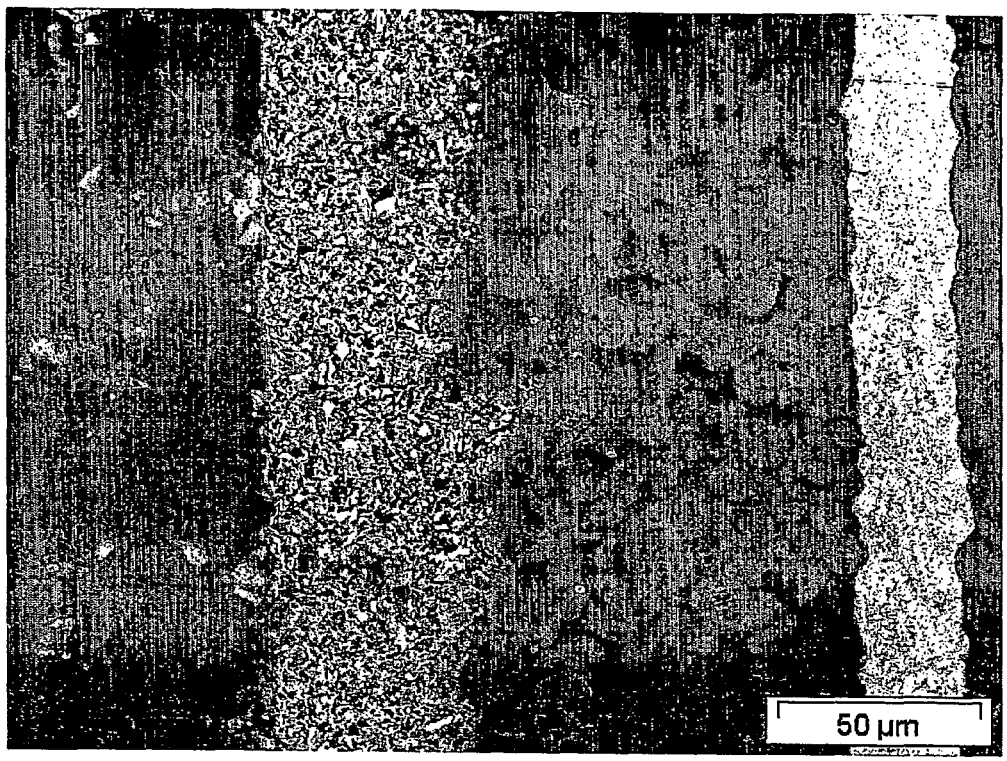
FIG. 5 and FIG. 6 show scanning electron micrographs of a separator-electrode (anode) unit produced according to example 2a of the present invention, in cross section.
Figure 6:
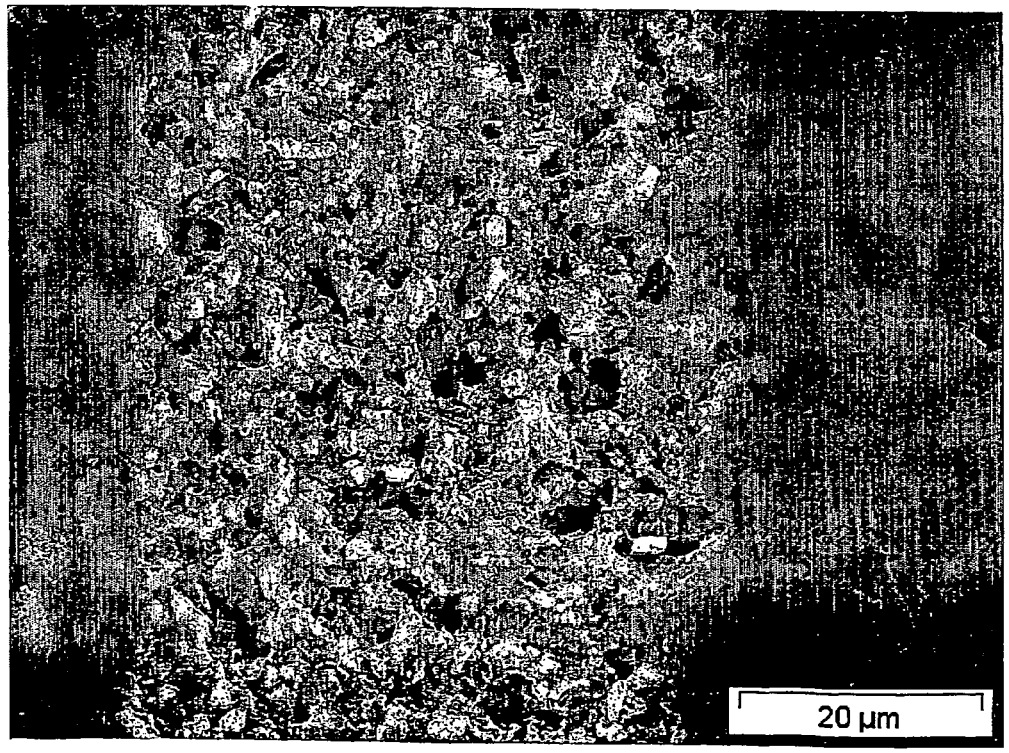

A double-coated graphite electrode on a copper current collector is coated therewith in a continuous roller-coating operation (forward feed speed: 8 m/h) initially from one side and then dried at 150° C. for 30 min. FIG. 3 shows the coated electrode. The add-on weight is about 115 g/m², and separator layer thickness is about 45 μm.

INVENTIVE EXAMPLE 2b

Coating a Negative Electrode (Anode) with a Ceramic Separator Layer 45 g each of MZS-1 and MZS-3 Al₂O₃ from Martinswerke are dispersed in 160 g of ethanol. To this solution are added 10 g of tetraethoxysilane (Dynasilane A, Degussa AG), 10 g of methyltriethoxysilane (Dynasilane MTES, Degussa AG) and 10 g of GLYMO Degussa-Silane (likewise Degussa AG) and also 15 g of 5% HNO₃. The mixture is stirred overnight to achieve good dispersion of the Al₂O₃ powder.

A double-coated graphite electrode on a copper current collector is coated with this slip in a continuous rollercoating operation as described in comparative example 1 (forward feed speed: 8 m/h) initially from one side and then dried at 150° C. The add-on weight is now about 45 g/m², and separator layer thickness is still only about 20 μm.

INVENTIVE EXAMPLE 3

Lithium Battery Containing an Inventive Separator-Electrode Unit

The separator-cathode unit of inventive example 1b and the separator-anode unit of inventive example 2b are laminated together to construct a battery cell. The battery is saturated with an electrolyte of 1M LiPF₆ in ethylene carbonate/dimethyl carbonate. Battery performance is stable over several hundred cycles. Owing to the distinctly low internal resistance in the separator, the cell can be charged with constant current to virtually the entire capacity. Owing to the thin separator layer and the lower basis weight, moreover, not only the mass—but also the volume-based specific energy densities are distinctly higher.

What is claimed is:

1. A separator-electrode unit capable of functioning in a lithium battery as a separator-electrode unit, the unit comprising a porous electrode and a separator layer applied to said porous electrode, wherein the separator-electrode unit comprises an inorganic separator layer which comprises at least two fractions of metal oxide particles which differ from each other in their average particle size and/or in the metal, the separator layer comprising metal oxide particles having an average particle size ($D_g$) which is greater than the average pore size (d) of the pores of the porous electrode that are adhered together by metal oxide particles having an average particle size ($D_k$) which is smaller than the pores of the porous electrode.

2. A separator-electrode unit according to claim 1, wherein the separator layer has a thickness (z) which is less than 100 $D_g$ and not less than 1.5 $D_g$.

3. A separator-electrode unit according to claim 1, wherein the separator layer has a thickness (z) which is less than 20 $D_g$ and not less than 5 $D_g$.

4. A separator-electrode unit according to claim 1, wherein the metal oxide particles having an average particle size ($D_g$) which is greater than the average pore size (d) of the pores of the porous electrode are $Al_2O_3$ and/or $ZrO_2$ particles.

5. A separator-electrode unit according to claim 1, wherein the metal oxide particles having an average particle size ($D_k$) which is smaller than the average pore size (d) of the pores of the porous electrode are $SiO_2$ and/or $ZrO_2$ particles.

6. A separator-electrode unit according to claim 1, wherein the metal oxide particles having an average particle size ($D_g$) which is greater than the average pore size (d) of the pores of the porous electrode have an average particle size ($D_g$) of less than 10 μm.

7. A separator-electrode unit according to claim 1, wherein the separator layer comprises a coating with shutdown particles which melt at a desired shutdown temperature.

8. A separator-electrode unit according to claim 7, wherein the shutdown particles have an average particle size ($D_w$) which is not less than the average pore size ($d_s$) of the pores of the porous separator layer.

9. A separator-electrode unit according to claim 7, wherein the shutdown particle layer has a thickness ($z_w$) which ranges from about equal to the average particle size of the shutdown particles ($D_w$) up to 10 $D_w$.

10. A separator-electrode unit according to claim 1, wherein the separator layer has a porosity of from 30 to 70%.

11. A separator-electrode unit according to claim 1, wherein the unit is bendable down to a radius of 50 cm without damage.

12. A separator-electrode unit according to claim 1, wherein the electrode is an electrode which is capable of functioning as a positive electrode (cathode) or as a negative electrode (anode).

13. A lithium battery comprising said separator-electrode unit according to claim 1.

14. A method for making a lithium battery, said method comprising:
  incorporating said separator-electrode unit according to claim 1 in a battery comprising lithium to obtain said lithium battery.

* * * * *